United States Patent
DeSalve

(10) Patent No.: US 6,871,774 B2
(45) Date of Patent: Mar. 29, 2005

(54) ALUMINUM TUBULAR HEAT EXCHANGER AND METHOD OF CONSTRUCTION

(75) Inventor: Dennis W. DeSalve, Findlay, OH (US)

(73) Assignee: Triumph Brands, Inc., Wayne, PA (US)

( * ) Notice: Subject to any disclaimer, the term of this patent is extended or adjusted under 35 U.S.C. 154(b) by 0 days.

(21) Appl. No.: 10/327,298

(22) Filed: Dec. 20, 2002

(65) Prior Publication Data

US 2003/0127497 A1 Jul. 10, 2003

Related U.S. Application Data

(60) Provisional application No. 60/347,085, filed on Jan. 4, 2002.

(51) Int. Cl.[7] .............................. B23K 31/02; F28F 9/26
(52) U.S. Cl. ........................ 228/183; 228/246; 165/177
(58) Field of Search ................................ 228/183, 245, 228/246; 165/177

(56) References Cited

U.S. PATENT DOCUMENTS

| | | | |
|---|---|---|---|
| 2,267,315 A | | 12/1941 | Stikeleather |
| 3,496,629 A | | 2/1970 | Martucci et al. |
| 3,734,175 A | * | 5/1973 | Christensen ................ 165/158 |
| 4,152,818 A | | 5/1979 | Mort et al. |
| 4,156,299 A | * | 5/1979 | Kovac .......................... 16/108 |
| 4,207,662 A | | 6/1980 | Takenaka |
| 4,482,415 A | | 11/1984 | Mort et al. |
| 4,848,448 A | * | 7/1989 | Kaarre .......................... 165/158 |
| 5,181,561 A | * | 1/1993 | Ayers et al. ................. 165/162 |
| 5,366,006 A | * | 11/1994 | Lu et al. ....................... 165/173 |
| 5,464,145 A | | 11/1995 | Park et al. |
| 5,507,338 A | | 4/1996 | Schornhorst et al. |
| 5,697,546 A | * | 12/1997 | Cicioni ........................ 228/183 |
| 6,076,597 A | * | 6/2000 | Manning et al. ............. 165/163 |
| 6,102,106 A | * | 8/2000 | Manning et al. ............... 165/76 |
| 6,170,738 B1 | | 1/2001 | Otsuka et al. |
| 2003/0127497 A1 | * | 7/2003 | DeSalve ...................... 228/183 |

* cited by examiner

*Primary Examiner*—Kiley Stoner
(74) *Attorney, Agent, or Firm*—Roger W. Herrell, Esq.; Dann, Dorfman, Herrell and Skillman

(57) ABSTRACT

A method of establishing a leak tight and structural connection between a core tube and an accommodating header plate in a tubular heat exchanger, including the steps of positioning the core tube into bores of the header plate and a braze foil, installing a ferrule inside the core tube end, radially expanding the ferrule in the core tube end, thus expanding the core tube end into intimate contact with the header plate in which it is received, deforming a ferrule into pinching contact with the braze foil plate, directing the flow of the braze material towards the contact surface area, and brazing the tubular heat exchanger in order to form a seal at the intimate contact area. A leak tight connection and a tubular heat exchanger having a leak tight connection produced via the noted method are also set forth.

38 Claims, 7 Drawing Sheets

ALUMINUM TUBULAR HEAT EXCHANGER AND METHOD OF CONSTRUCTION

CROSS-REFERENCE TO RELATED CASES

The present application claims the benefit of the filing date of U.S. Provisional Application Ser. No. 60/347,085; filed Jan. 4, 2002.

BACKGROUND OF THE INVENTION

In the art of fabricating tube and shell heat exchangers, it is well known that a proper seal and support structure is required at each header plate-core tube interface. Even minor leaks at the tube joints will impair the function of the heat exchanger. Prior inventions have taken two approaches to establishing such a connection at this interface. The first approach was via a purely mechanical connection. The second approach has been via a metallurgical bonding, particularly brazing.

The first noted approach to be discussed is the method of mechanically sealing this interface. Prior art, such as U.S. Pat. No. 4,152,818 to Mort et al., sets forth an example of such a technique. The mechanical sealing process first involves inserting an end of the core tube into a hole in the header plate. A rivet is then inserted into the core tube end and expansion of the rivet subsequently creates a high load friction connection end of the core tube into a hole in the header plate. A rivet is then inserted into the core tube end and expansion of the rivet subsequently creates a high load friction connection between the core tube and the header plate. This resulting connection serves as the joint for the interface. Several methods can be used to expand the rivet, but a complete expansion requires all contact areas between the core tube and header plate to be a maximum of 0.001 inch to intimate. In order to provide this complete seal over 100% of the interface, several process steps may be required. Even with a 100% complete seal, varying load forces can damage this mechanical seal. For example, vibrations and pressure fluctuations may cause one of the header plate and core tube to move relative to the other. In order to assure completion of the seal, an added step, as shown in prior art U.S. Pat. No. 4,482,415 to Mort et al., of using a sealant material at each header plate-core tube interface can be used. In this type of process, the joint is codependent on the mechanical process and the sealant process.

Another approach for sealing this joint is via a braze joint construction. Prior art, such as U.S. Pat. No. 4,207,662 to Takenaka, sets forth an example of using clad braze materials for this process. In such a process, the clad braze material is located on the exterior surface of one of the objects to be joined. For example, a core tube is inserted into a hole in a header plate having braze material located on at least one of its sides. Upon brazing, the clad material melts and forms the joint. Alternatively, the core tube could be clad with braze material. However, clad materials are typically produced as flat stock and the products shaped therefrom, for example the header plate or core tube, is preferably also flat in order to satisfactorily retain the clad material. During brazing, the clad braze material melts and, like any liquid, will flow and take the path of least resistance. With a flat surface, it is therefore difficult to direct the flow of the melted braze material. In order to overcome the difficulties in directing the flow of melted clad material, the previously mentioned prior art patent sets forth an example of using a flat, inclined surface to direct the flow of the melted material towards the intended area of joining.

Another prior art braze joint construction approach involves the use of diffusion bonded braze material. Typically such a manufacturing process first includes the initial diffusion bonding of a braze foil alloy to the header plate in order to bond the braze material in place. The core tubes are then inserted into holes in the header plate, followed by a mechanical staking operation of the tube ends in order to form a clearance controlled or intimate bond at the header plate-core tube surface. Subsequent vacuum brazing is then employed to bond the tube end to the header plate. An intimate bond is critical to any brazing operation. It is the intimate contact between the header plate and core tube that promotes the wetting of the joint surfaces with the braze alloy. A mechanically staked core tube, though, exhibits overall distortion due to the biaxial (radial and axial) stressing of the tubes that occurs during the noted staking operation. The core tube staking process is generally performed manually, and in addition to it being labor intensive, is largely uncontrolled thus introducing excessive process variations and large compressive stresses in the core tubes. This process often creates product rejections ranging from braze joint leaks to unacceptable dimensional distortions. In addition, the braze alloy diffusion bonding process is dependent on a complex vacuum process and often produces unacceptably low yields. The diffusion bonding process also produces changes in the aluminum header plate material, via diffusing out the silicon, which has a negative effect on the brazing process as well as the header plate material.

Various other methods have been used in order to create the critical intimate contact between the bonding surfaces. Prior art, such as U.S. Pat. No. 3,496,629 to Martucci et al., teaches welding the core tube to the header plate in order to produce the intimate contact area.

Another example of a prior art brazing technique is set forth in U.S. Pat. No. 5,464,145 to Park et al. This technique does not address the need for an intimate contact area between the bonding surfaces. Other prior art brazing techniques are in U.S. Pat. No. 2,267,315 to Stikeleather and U.S. Pat. No. 5,507,338 to Schornhorst et al. These two references set forth a process of joining the tubes to each other, but not to the header plate. A further reference, U.S. Pat. No. 6,170,738 to Otsuka et al. sets forth the use of a specific material for brazing low-melting point aluminum material parts.

SUMMARY OF THE INVENTION

The present invention overcomes the prior art's inability of producing quality braze joints by providing a method of achieving the necessary contact pressure between core piece parts prior to brazing. The invention also provides properly sealed tubular heat exchanger core tube-header plate joints and tubular heat exchangers having properly sealed core tube-header plate joints. A proper sealing joint will ensure that the two distinct fluids that flow through the heat exchanger are not intermixed.

It is an advantage of the present invention to provide a leak tight connection between a core tube and a header plate using a braze process for aluminum alloy tubular heat exchangers. This is accomplished by first aligning all of the necessary heat exchanger components: header plates, braze foil, and core tubes. The core tubes are placed inside its mating header plate apertures and a braze foil plate is positioned on top of the header plate. A ferrule is then inserted into each core tube along with an expanding mechanism. A feature of an illustrated embodiment of the present invention includes radially expanding the ferrule in order to provide a desired intimate contact area between the header plate and an adjacent core tube. This expansion of the ferrule provides another feature, namely pinching or compressing the braze foil, thereby providing an impetus for the direction of the flow of the braze foil material during the brazing process. During the brazing process, the braze foil melts and flows in its intended path or direction, namely into the header plate-core tube junction contact area. The molten braze material enters the microscopic pores at the header plate-core tube junction contact area via capillary action and bonds the core tube to the header plate. The brazing process, via vacuum brazing or via brazing in an inert atmospheric furnace, ensures that the joint will withstand any detrimental forces and elements, such as corrosion, vibration and pressure variations, encountered by the connection.

Another advantage of an illustrated embodiment of the present invention includes limiting the core tube stresses, during the ferrule expansion, solely to radial stresses. The present invention overcomes difficulties encountered in the prior art due to the biaxial stresses resulting from the mechanical staking operation. The noted staking operation also causes axial, or longitudinal, stresses which result in undesired longitudinal displacement, as well as subsequent weakening, distortion and/or elongation, of the core tube material.

Another advantage of the present invention is that it is relatively simple to alter the length of the braze joint by varying the dimensions of the ferrule. The length of the ferrule shank portion helps to determine the length of the braze joint. With predetermined changes in the thickness of the braze foil and tolerances of the involved parts, the braze joint length can readily be changed by altering the length of the ferrule shank. The braze contact area between the tube end and the header plate is largely determined by the length of the ferrule shank. Only this junction area can provide the contact pressure needed for a proper braze joint. Likewise, the annular area of the ferrule head bottom surface determines the amount of braze material that can be used to form the joint. By varying the surface area of the ferrule head, the amount of the pinched braze material is also varied.

A further embodiment of the present invention pertains to the deformation of an annular sleeve in order to provide the required peripheral contact area between the header plate aperture and its inserted, adjacent core tube end. Deformation of the sleeve not only determines the noted contact area between the header plate and core tube, but also the size of the bottom surface area of the sleeve that pinches the braze foil for subsequent material flow into the contact area.

As previously described, the advantages of the present invention are fulfilled via a simplified process of preparing a header plate-core tube joint prior to the braze process for an aluminum alloy tubular heat exchanger and the heat exchangers produced with this process. Further features and advantages of the present invention will become apparent to those skilled in the art upon review of the following specification in connection with the accompanying drawings.

DETAILED DESCRIPTION OF THE PREFERRED EMBODIMENTS

Figure 1:
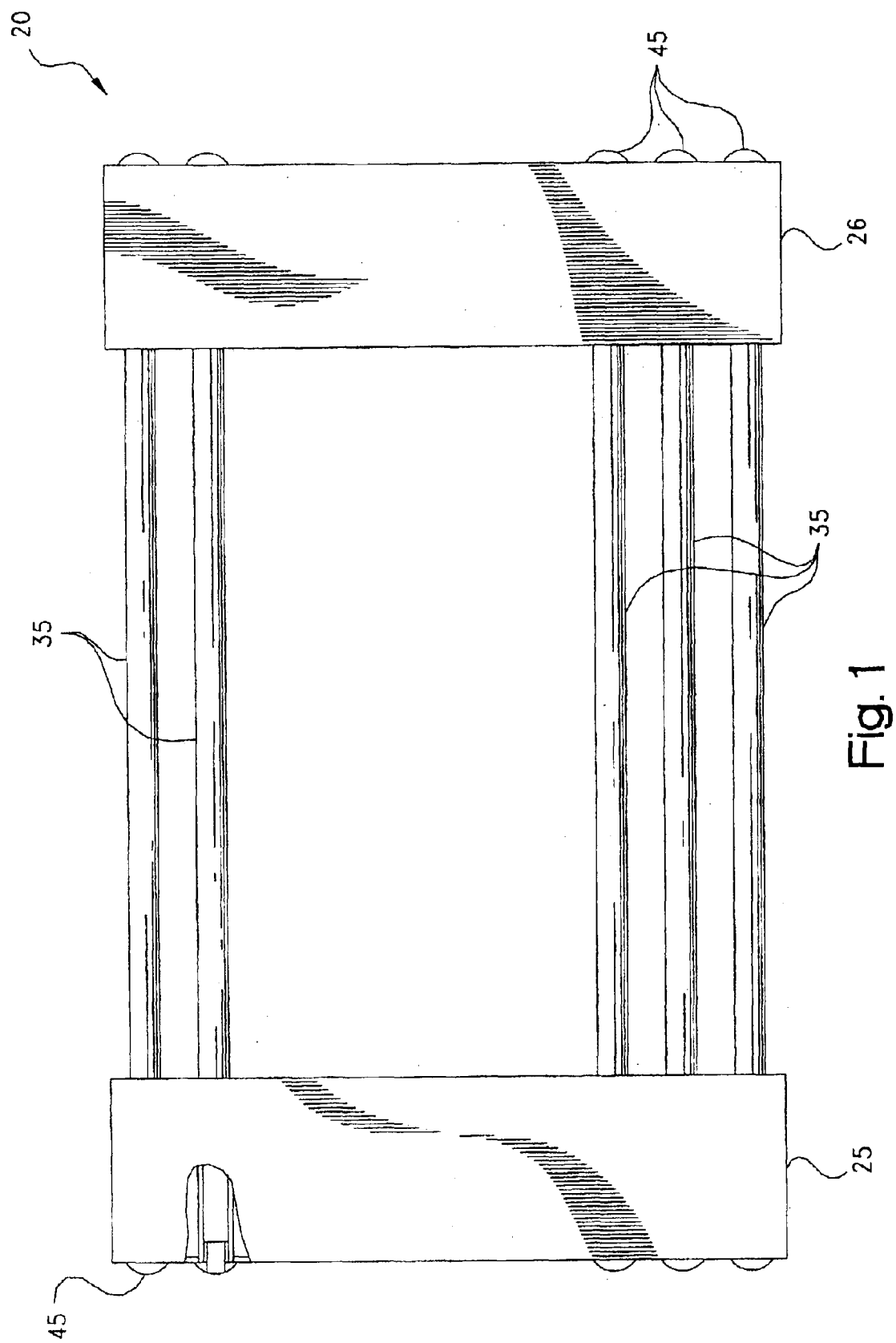
FIG. 1 is a schematic, simplified side elevation of a tubular heat exchanger, comprised of opposed header plates joined by tubes mounted therein, with a portion of one of the header plates being broken away to show a tube joint.
Figure 2:
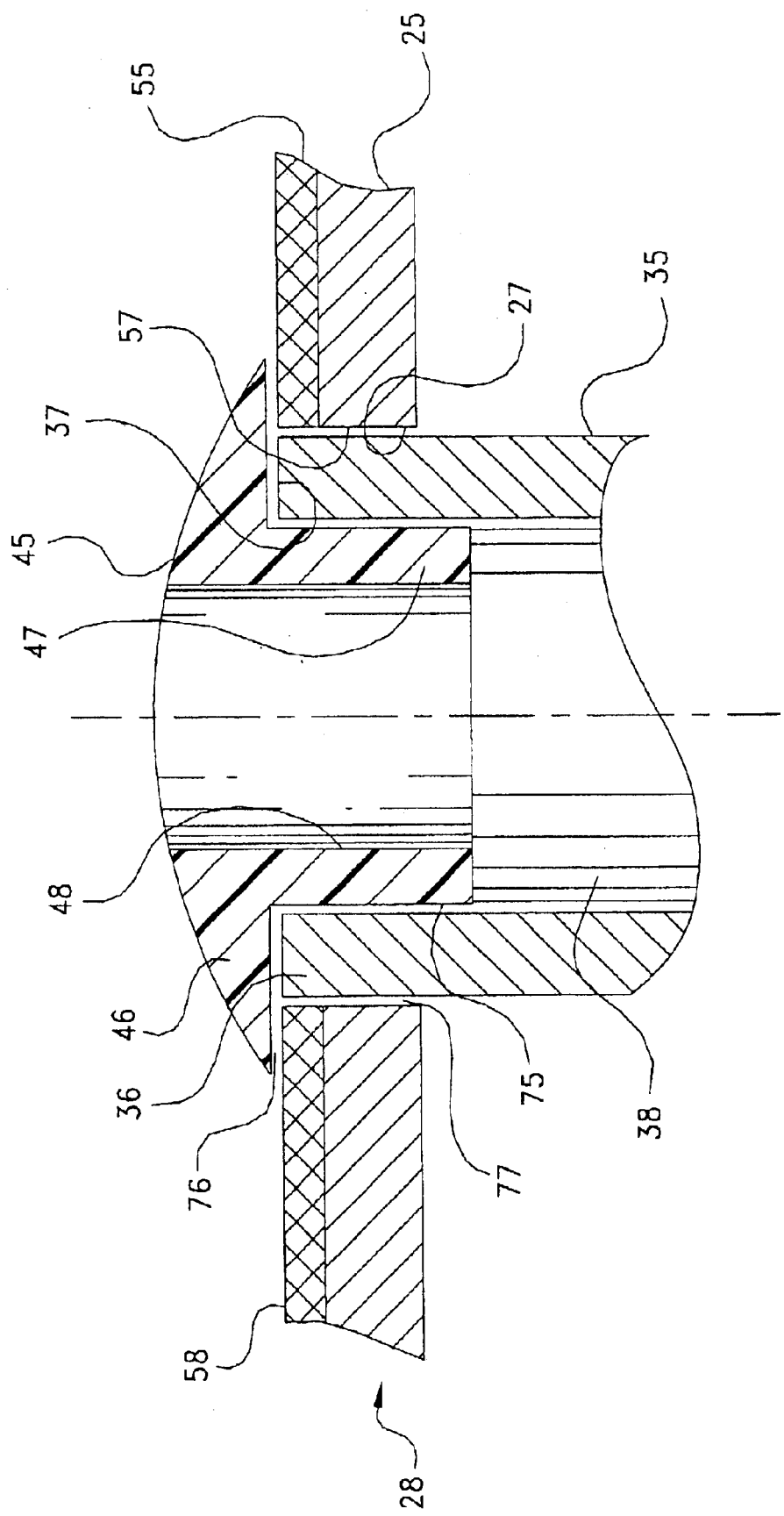
FIG. 2 is an enlarged cross-sectional detailed view of the broken away portion of one embodiment of the tube joint of FIG. 1, showing a portion of a header plate, braze foil plate, and tube, with a rivet inserted into the tube prior to the rivet being expanded.

Referring to the drawings and particularly to FIGS. 1 and 2, a first preferred embodiment is shown generally at 20 in the form of a tubular heat exchanger. This invention has a specific, but not limited, utility in the field of tubular heat exchangers, particularly when manufactured of aluminum alloys. The main components include two opposed header plates 25 and 26, joined via a plurality of core tubes 35 (only a few of which are illustrated in the interest of simplicity), rivets or ferrules 45, and a braze foil 55.

The plurality of core tubes 35 are positioned between and joins the two header plates 25 and 26, and, for assembly purposes, core tubes 35 are initially affixed to the header plates 25, 26 with ferrules 45. Core tubes 35 are made of a rigid, thin, metallic material, such as from aluminum or an aluminum alloy for example, for good heat transfer properties. Core tubes 35 are parallel to each other and perpendicular to header plates 25 and 26 and, when finally affixed thereto, present fluid-tight joints therebetween. As is well known to those skilled in the heat exchanger art, when provided with the necessary header tanks (not shown), a first fluid flows through bores 38 in the hollow core tubes 35 at core tube ends 36 and is discharged at their opposite ends. A second fluid flows over and in between core tubes 35. The two fluids do not intermix, but a transfer of heat from one fluid to the other takes place. Proper sealing joints, where the core tubes 35 are affixed to the header plates 25 and 26, ensure that the two fluids are kept separate.

Figure 5:
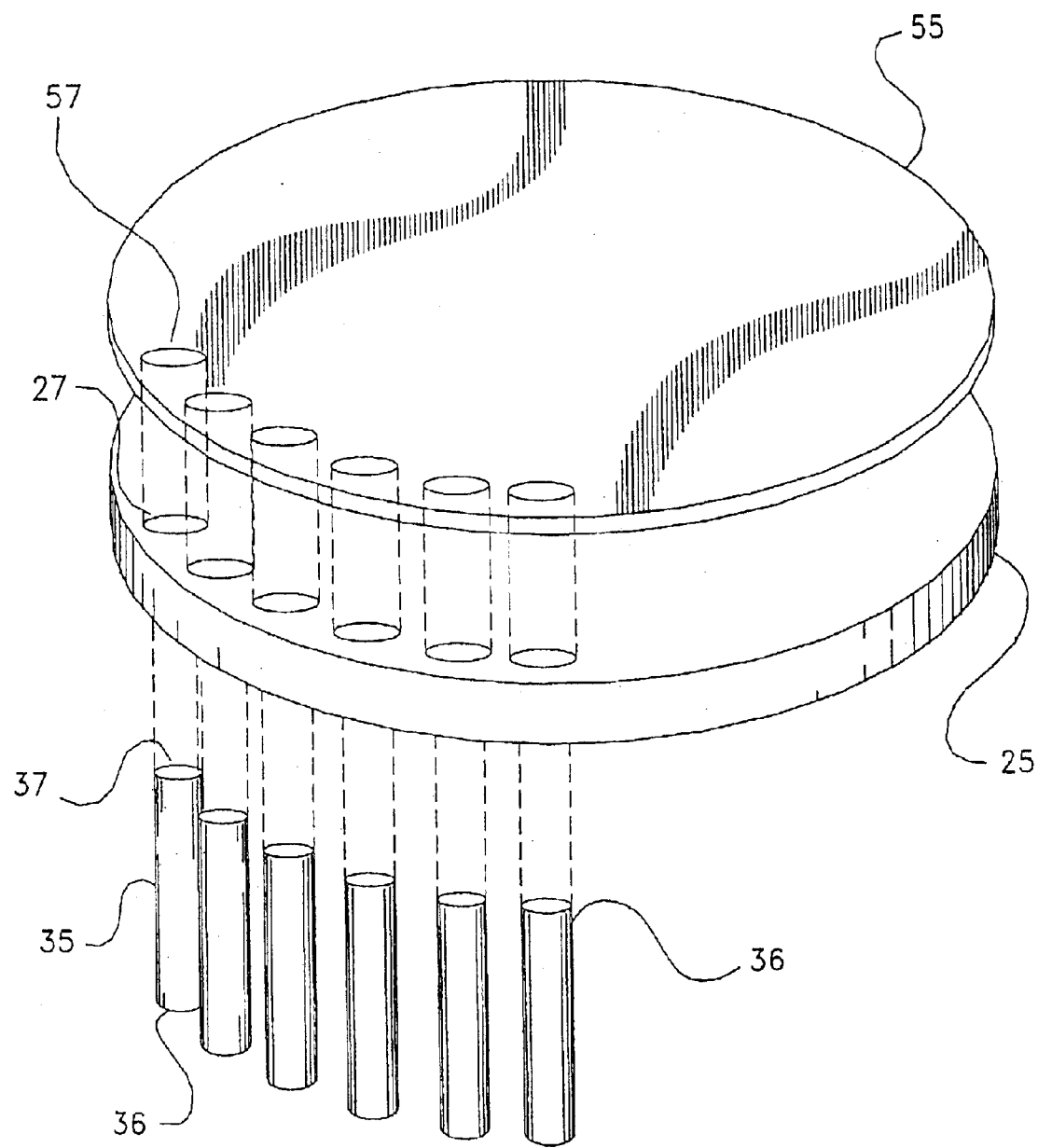
FIG. 5 is a schematic, exploded view of the assembly of the heat exchanger tubes with the header plate and the braze foil plate.

The configurations of header plates 25 and 26 are substantially similar so that a description of one will be applicable for both. Header plates 25 and 26 are made of a metallic material, such as from aluminum, or an aluminum alloy, for example. Also, the method of affixing core tubes 35 to header plates 25, 26 is the same for all core tubes 35 so a description of one will be applicable to all. Referring to FIGS. 2 and 5, core tubes 35 are readily deformable so that the portions thereof that adjoin apertures or through bores 27 in header plate 25 may be readily radially expanded into close contact with the header plate aperture wall that defines through bore 27. The outside diameter of core tubes 35 is approximately equal to the diameter of header plate through bores 27.

Once an end 36 of core tube 35 has been inserted through header plate aperture 27 so that it axially extends slightly therefrom, a braze foil 55, having through bores 57 that are substantially coincident in size and spacing with bores 27 of header plate 25, is placed on top of header plate 25 with core tube ends 36 extending through at least a portion of the axial extent of braze foil bores 57. Extending core tube ends 36 thus also function as locators and retainers for braze foil 55. The annular end surfaces 37 of extending core tube ends 36 are preferably coplanar with the foil upper surface 58 within a reasonable tolerance.

Figure 3:
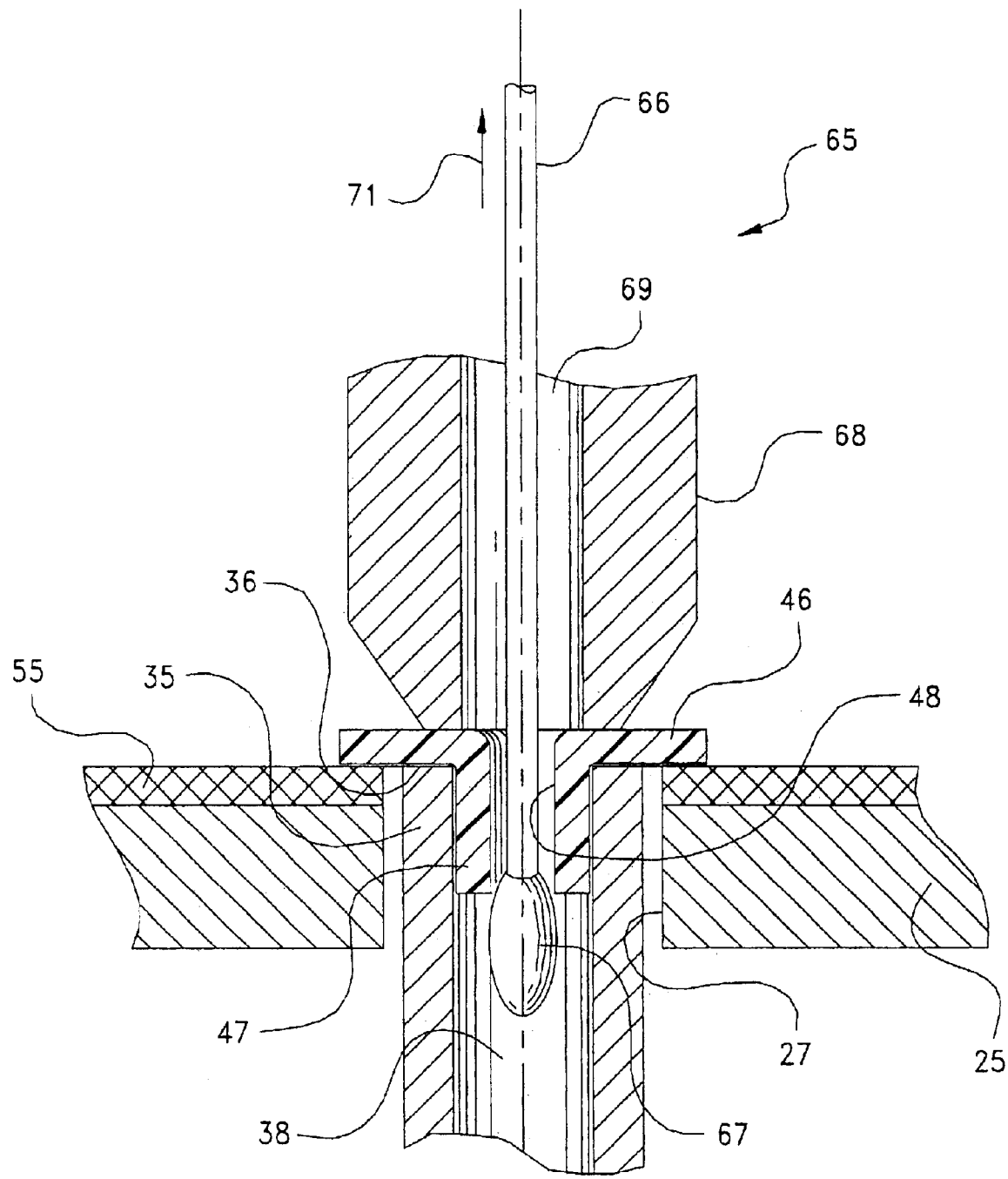
FIG. 3 is a longitudinal, cross-sectional view of an expansion tool inserted into the unexpanded rivet in the tube joint.
Figure 4:
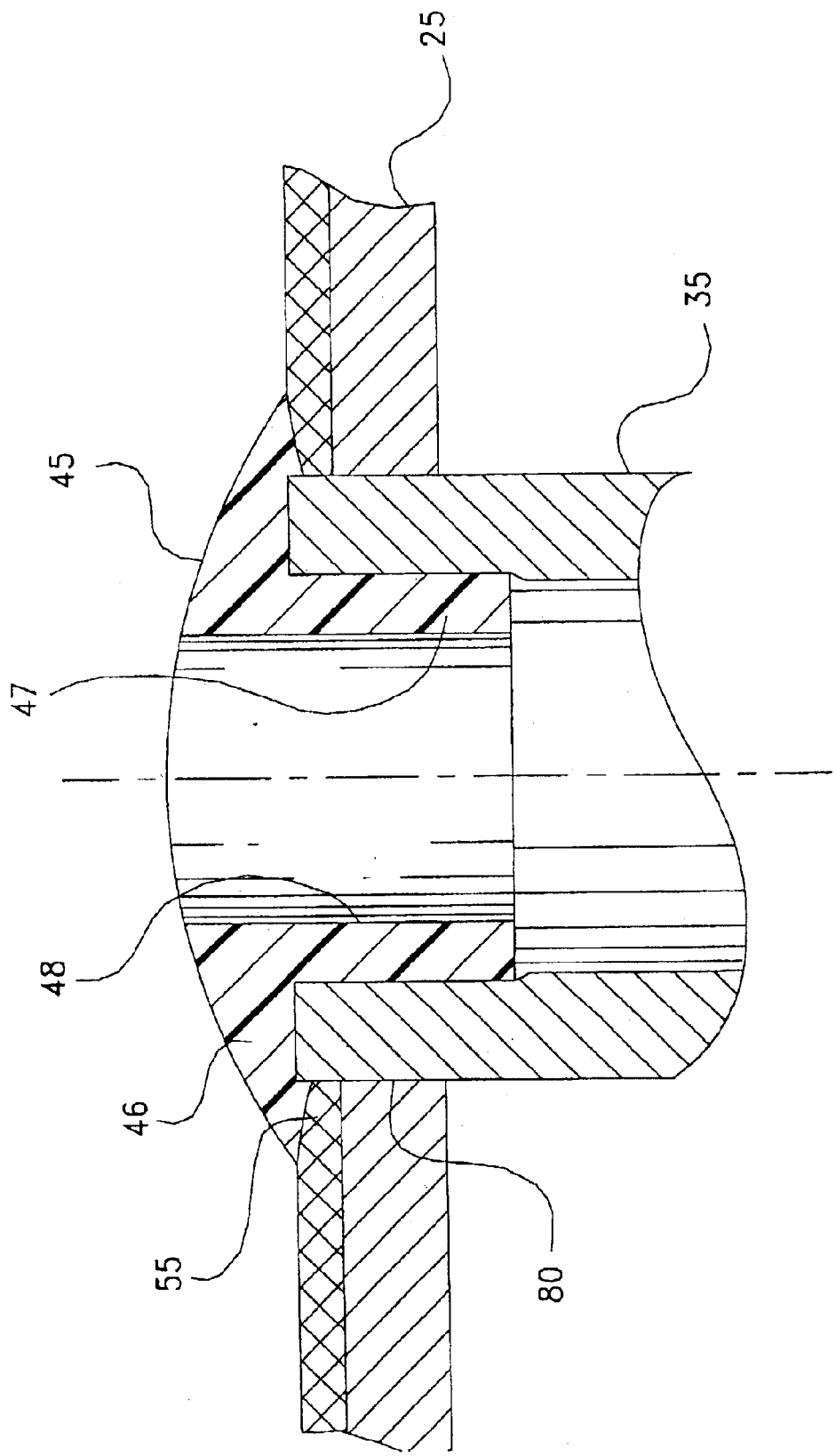
FIG. 4 is a detail view, similar to that of FIG. 2, but showing the rivet now expanded in place.

Following the noted assembly of core tubes 35 into header plate 25 and the placement of braze foil 55 around core tube ends 36, a rivet or ferrule 45 is placed into each tube end opening 36. As best seen in FIG. 2, ferrule 45, which may, for example, take the form of a hollow rivet, includes a head portion 46 and an annular shank portion 47 as well as a central, longitudinal through bore 48. Ferrule head 46 may be of any predetermined size or shape, such as, for example, having a domed head as shown in FIGS. 2 and 4 or a flat head, as shown in FIG. 3. Ferrule head 46 extends, at a minimum, both axially and radially beyond the annular end surface 37 of tube end 36 and over a portion of the top surface 58 of braze foil 55, preferably for a distance greater than the wall thickness of core tube 35. The outside diameter of shank portion 47 is approximately equal to the inside diameter of core tube 35 so as to permit a slip fit thereof into core tube bore 38. Ferrule or rivet 45 is made of a rigid malleable, non-ferrous metallic material, such as of an aluminum alloy, for example.

Referring to FIGS. 2 and 3, the ferrule 45 is radially expanded by means of an expansion mandrel tool 65. This tool 65 includes a connector 66, such as a wire or rod, having a teardrop shaped, or ball shaped, expander portion 67 affixed at one end. Expander portion 67 has an outside diameter slightly greater than the diameter of ferrule bore 48. Tool 65 also includes a collet 68 having an axial through bore 69 extending therethrough. Connector 66 is adapted to slidably move within collet 68 through bore 69. In order to radially expand ferrule 45, expander portion 67 is placed inside core tube 35 with connector 66 extending outwardly from the header plate bore 27. Ferrule 45 is placed around connector 66 and inserted into core tube bore 38. The collet 68 is placed in contact with ferrule head 46. Expander 67 is then pulled upwardly through ferrule bore 48, in the direction of arrow 71, while the collet 68 pushes ferrule head 46 into intimate contact with tube end 36 and braze foil 55. As expander 67 is pulled through ferrule bore 48, ferrule 45 will tend to move in the same direction as expander 67. Collet 68 counteracts this motion, thus keeping ferrule head 46 in intimate contact with tube end 36 and braze foil 55. Referring now to FIGS. 3 and 4, as expander 67 is pulled through ferrule bore 48, ferrule shank 47 radially expands into core tube 35, thus in turn radially expanding core tube 35 into a physical contact area 80 with the header plate aperture wall that defines bore 27. At the same time, the noted radial expansion also causes ferrule head 46 into intimate pinching contact with tube end 36 and braze foil 55. Expansion of ferrule shank 47 also ensures that fluid is not restricted when flowing through the core tube 35 at the ferrule shank inserted portion.

As can best be seen in a comparison of FIGS. 2 and 4, not only is ferrule 45 radially expanded into contact with its adjacent parts, namely tube 35 and braze foil 55, but these parts, in turn, are subsequently moved into intimate contact with their adjacent part, namely header 25. For example, as can be seen in FIG. 2, prior to the noted radial expansion an annular gap 75 exists between the ferrule shank 47 and core tube 35. Another gap 76 exists between the lower surface of ferrule head 46 and braze foil surface 58. A further annular gap 77 also exists between core tube 35 and the header plate aperture wall that defines bore 27. Referring to FIGS. 2 and 4, gaps 75, 76, and 77 are substantially eliminated as a result of the radial expansion of ferrule 45. Ferrule shank 47 is thus radially expanded into intimate contact with core tube 35, thus eliminating gap 75. Due to its rigid, but malleable metallic material construction, core tube 35 is also radially expanded into intimate contact with header plate 25, thus eliminating gap 77. Ferrule head 46 is expanded or deformed into contact with core tube end 36 and braze foil 55. Due to the inherent malleable property of braze foil 55, ferrule head 46 is able to pinch or compress the foil 55 between head 46 and plate 25 thus providing the impetus for the braze alloy to follow a specific, desired directional path upon brazing, in a manner to be described hereinafter.

With the noted expansion at the header/tube surface providing a provisional connection, the mechanically assembled heat exchanger is then subjected to a braze and preferably to a vacuum braze operation. The heat exchanger is placed in a vacuum furnace and heated to a predetermined elevated temperature and for a length of time sufficient to melt the braze foil 55, while not significantly altering any of the metallic properties of core tube 35, header plate 25, or ferrule 45. The time and temperature needed to perform this process is known to those skilled in the art.

Referring to FIG. 4, the plastically deformed ferrule head 46, by pinching braze foil 55 in the vicinity of core tube-header plate contact area 80, directs the braze foil alloy 55 to flow towards core tube 35. Although core tube 35 and header plate 25 are in close intimate contact, the melted braze foil alloy flows by capillary attraction into the microscopic pores of the metal joint at core tube-header plate contact area 80, thus forming a fillet. During the brazing process, in addition to the capillary flow, some of the constituents, including silicon, of braze alloy 55 also diffuse into the core tube 35 and header plate 25 on a molecular level. Thus, upon melting, silicon molecules from braze foil alloy 55 diffuse into core tube 35 and header plate 25 thereby providing a braze joint fillet. Due to the position or location of expanded ferrule 45, the braze material does not deviate from its directed path between core tube 35 and header plate 25. Specifically the braze material does not flow into contact with ferrule shank 47. The formation of eutectic silicon at the joint fillet with diffusion at least partially into the parent metal thicknesses is required for achieving adequate braze joint strength. As a general rule, for maximum structural life based on shear loading, it is known that the braze joint fillet length should be four times the thickness of the thinnest material to be joined. Therefore the length of ferrule shank 47, the thickness of braze foil alloy 55, the tube thickness, as well as the header bore and foil bore tolerances are all predicated on this ratio and can easily be determined by those of ordinary skill in the art. Further, the size of ferrule head 46 can determine the amount of braze foil alloy 55 that is pinched during the expansion process, thus defining the amount of braze material available for formation of the joint fillet upon heating.

As an alternative to vacuum brazing, such brazing could be accomplished in an inert environment furnace up to a predetermined temperature at which the braze material is melted, while the other metallic components remain unmelted. This inert environment may include both a partial vacuum and an oxide-reducing gas atmosphere.

Figure 6:
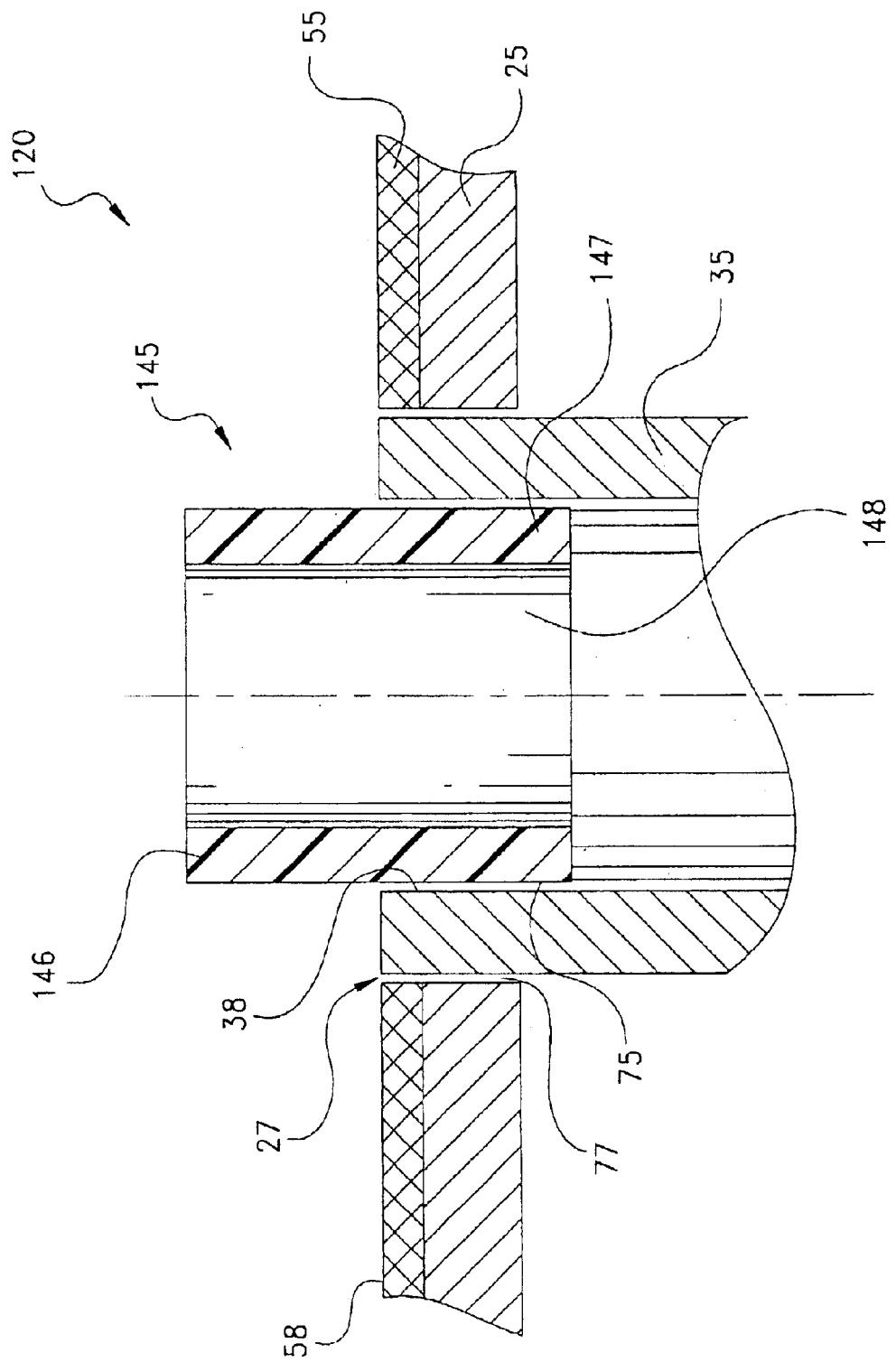
FIG. 6 is an enlarged detail view of the broken away portion of another embodiment of a tube joint of this invention, showing a portion of the header plate, braze foil plate and tube with a deformable ferrule inserted into the tube, prior to the ferrule being expanded.

A second embodiment 120 of the present invention, which differs from first embodiment 20 only as to ferrule 145, is illustrated in FIG. 6. Since all parts, except for ferrule 145, are substantially similar to the first embodiment 20 the detailed description thereof will not be repeated. After the positioning of header plate 25, core tube 35, and braze foil 55, ferrule 145 is positioned inside core tube 35. Ferrule 145 preferably takes the form of an annular sleeve having a central longitudinal through bore 148. The outer diameter of ferrule 145 is selected so as to permit a slip fit thereof into core tube bore 38 and minimizing gap 75. Ferrule 145 is made of a malleable non-ferrous metallic material such as an aluminum alloy for example and includes a top portion 146 and a bottom portion 147. Top portion 146 axially extends, at a minimum, past the top surface 58 of braze foil 55, preferably for a distance greater than the wall thickness of core tube 35. Ferrule bottom portion 147 extends longitudinally into core tube 35 beyond the inner end surface of header plate 25 (located on the outside of core tube 35).

Figure 7:
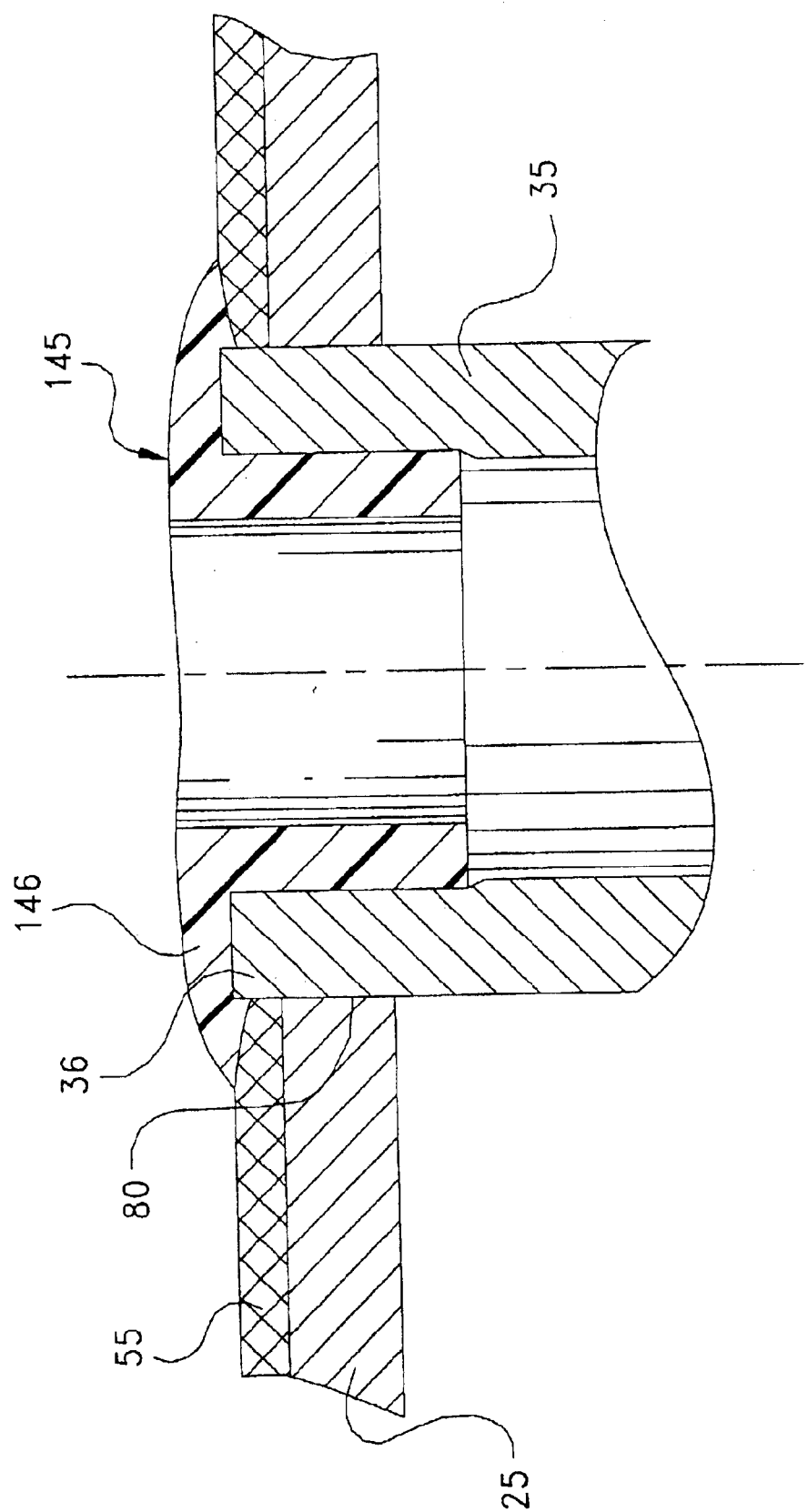
FIG. 7 is a detail view, similar to that of FIG. 6, but showing the ferrule swaged and expanded in place.

Referring now to FIG. 7, in order to provide the desired intimate contact between ferrule 145, core tube 35, and header plate 25, as well as between ferrule 145 and braze foil 55, ferrule 145 is radially deformed, such as via swaging. During the swaging process the inside and outside diameters of ferrule 145 are enlarged so that the ferrule's cylindrical wall is radially pressed against core tube 35, thus eliminating any remaining portion of gap 75. Core tube 35 is thereby outwardly pressed against header plate 25 so that gap 77 is substantially eliminated. Referring to FIG. 7, ferrule top portion 146 is also deformed, such as via swaging, then mushrooming same outwardly over core tube end 36 so that the top cylindrical surface is laterally pressed into contact with braze foil 55. As in first embodiment 20, at least a part of ferrule top portion 146 is pinched into contact with braze foil 55 such that braze foil 55 later flows into the header plate-core tube interface 80 during the brazing process.

EXAMPLE

The following is a method exemplifying a successful vacuum braze process utilized with the first embodiment of the above-described invention.

Core tube 35 was constructed of a 6000 series, specifically 6951 aluminum alloy material.

Header plate 25 was also constructed of a 6000 series, specifically 6061 aluminum alloy material.

The composition of braze foil 55 was Aluminum Association Number 718 aluminum braze alloy.

The installation mandrel is obtainable from Textron Avdel Cherry Corporation as part number 7150-6003.

All core parts were cleaned and dried in a known manner in order to ensure that process oils, finger prints, and aluminum oxide formations were removed. As is well known in the art, this is accomplished by using a sequence of degreasers, deoxidizers, water rinses and drying cycles.

The braze cycle is performed to a recognized industry standard which entailed the following process. Thermal couples were positioned at varying spots in the core. Receptacles holding a predetermined amount of magnesium chips (for use as sacrificial getters) were placed at each end of the braze furnace. The furnace and specimen temperature were driven from room temperature to the final braze temperature using a series of temperature elevations and stabilization hold steps. It should be understood that the exposure and holding times are based on the mass of the specimen material. In this example, the final hold point prior to driving to the brazing temperature was maintained for 30 minutes insuring the degree of vacuum pressure was in the 0.00001 torr range. When the specimen reached 1090° F., the heat was turned off and the part was allowed to cool under vacuum to 1080° F. At 1080° F., a non-oxidizing atmospheric gas, such as an Argon backfill was introduced. The specimen was then gradually cooled to 650° F. The specimen was subsequently subjected to a solution heat treat process which involved heating the specimen to a range of approximately 950° F. to 1000° F. followed by rapidly quenching same in water. As is known in the industry, this process traps alloying elements in the grain boundary structure of the material to enable enhanced strength properties.

It should be noted that the present invention is not limited to the specified preferred embodiments and principles. Those skilled in the art to which this invention pertains may formulate modifications and alterations to the present invention. These changes which rely upon the teachings by which this disclosure has advanced are properly considered within the scope of this invention as defined by the appended claims.

What is claimed is:

1. A method of providing a leak tight and structural connection between a core tube and an accommodating header plate in a tube and shell type heat exchanger, including the steps of:

a. providing a header plate of a deformable metallic material with a core tube-accommodating through bore therein;

b. providing a metallic material braze foil with a core tube accommodating through bore therein;

c. providing a core tube of a deformable metallic material with an end having an outside diameter approximately the same as said header plate bore diameter;

d. positioning said braze foil on top of said header plate so that said accommodating bore in said braze foil is aligned with said accommodating bore in said header plate;

e. inserting said core tube end into the bore in said header plate so that it is received therein and said core tube end is substantially coplanar with said braze foil;

f. installing a ferrule of a deformable metallic material into said inserted core tube end, said ferrule including a first cylindrical body portion having an outside diameter approximately the same as the inside diameter of said core tube and a second annular portion extending axially outwardly of said core tube end and having a radial extent greater than the wall thickness of said core tube;

g. radially expanding said ferrule first cylindrical body portion so that cylindrical body portion is pressed against said core tube, thus in turn deforming said core tube into an area of intimate contact with said accommodating bore of the header plate;

h. deforming said ferrule second annular portion into an area of deformation contact with an adjacent portion of said braze foil at said intimate contact area of said header plate and core tube; and i. brazing said core tube and header plate in a brazing furnace at a temperature and for a time sufficient for said braze foil to melt and flow from said deformation contact area towards and into said intimate contact area of said header plate and core tube, thus forming a leak tight seal in said intimate contact area.

2. The method of claim 1, further including:

a. effecting the expansion of said ferrule by movement of a mandrel with an expander portion longitudinally through said ferrule from said cylindrical shank portion to and through said head portion, said expander portion having an outside diameter greater than the inside diameter of said ferrule; and b. simultaneously applying an opposing force to said ferrule in a direction opposite to said movement.

3. The method of claim 1, wherein said brazing step takes place in a vacuum furnace.

4. The method of claim 2, wherein said expander portion is a tear-drop shaped portion, flexibly affixed to said mandrel.

5. The method of claim 1, wherein the axial extent of said intimate contact area corresponds to the length of said ferrule first cylindrical body portion.

6. The method of claim 1, wherein the axial extent of said seal substantially corresponds to the length of said ferrule first cylindrical body portion.

7. The method of claim 1, wherein the surface extent of the braze foil substantially corresponds to a bottom surface area of said deformed ferrule second annular portion.

8. The method of claim 1, wherein said deformed ferrule second annular portion directs said melted braze foil material into said intimate contact area.

9. The method of claim 1, wherein the deformable metallic material of at least said core tube is comprised of one of aluminum and an aluminum alloy.

10. The method of claim 1, wherein said metallic material braze foil is comprised of an aluminum braze alloy.

11. The method of claim 1, wherein in the installing step, the ferrule takes the form of a rivet and the first cylindrical body portion of said ferrule is a cylindrical shank portion of said rivet and wherein the second annular portion of said ferrule is a head portion of said rivet.

12. The method of claim 11, wherein the head portion of said rivet is dome shaped.

13. The method of claim 11, wherein the head portion of said rivet is flat.

14. The method of claim 1, wherein in the installing step, the ferrule first cylindrical body portion takes the form of a cylindrical sleeve of a predetermined length having an outside diameter selected so as to permit a slip fit thereof into the inside diameter of said core tube, and the ferrule second annular portion forms an integral top portion of said cylindrical sleeve that extends axially outwardly from said core tube end at least past a top surface of said braze foil.

15. The method of claim 1, wherein in the brazing step, said braze foil melts and flows into said intimate contact area of said header plate and core tube via capillary action.

16. A leak tight connection between a core tube and an accommodating header plate in a tube and shell type heat exchanger prepared according to the method of claim 1.

17. A tube and shell type heat exchanger including a plurality of core tubes interposed between spaced accommodating header plates, wherein leak tight connections are provided between said core tubes and said header plates according to the method of claim 1.

18. A tube and shell type heat exchanger, comprising:
 a. a header plate of a deformable metallic material with a core tube accommodating through bore therein;
 b. a metallic material braze foil with a core tube accommodating through bore therein positioned on the outer surface of said header plate so that said accommodating bore in said braze foil is aligned with said accommodating bore in said header plate;
 c. a core tube of a deformable metallic material with an end having an outside diameter approximately the same as said header plate bore diameter received within said accommodating through bores of said header plate and said braze foil;
 d. a ferrule of a predetermined length and a deformable metallic material, said ferrule including a first cylindrical portion of a predetermined length having an outside diameter approximately the same as the inside diameter of said core tube inserted within said core tube end such that an expansion of said first cylindrical portion presses said core tube into intimate contact with said header plate and said ferrule having a second annular portion extending axially outwardly of said core tube end for a distance greater than a wall thickness of said core tube whereby deformation of said ferrule second annular portion directs said braze foil into said intimate contact area; and
 e. a fillet formed by heating said core tube and said accommodating header plate in a brazing furnace at a temperature and for a time sufficient for said braze foil to melt and flow from said deformation contact area towards and into said intimate contact area of said header plate and core tube and forming a seal therebetween via capillary action.

19. The tube and shell type heat exchanger of claim 18, wherein the ferrule comprises a rivet and the first cylindrical portion of said ferrule is a cylindrical shank portion of said rivet and wherein the second annular portion of said ferrule is a head portion of said rivet.

20. The tube and shell type heat exchanger of claim 18 wherein the ferrule first cylindrical portion comprises a cylindrical sleeve of a predetermined length having an outside diameter selected so as to permit a slip fit thereof into an inside diameter of said core tube, and the ferrule second annular portion forms an integral top portion of said cylindrical sleeve that extends axially outwardly from said core tube end at least past a top surface of said braze foil.

21. The tube and shell type heat exchanger of claim 18, wherein the deformable metallic material of at least said core tube is comprised of one of aluminum and an aluminum alloy.

22. The tube and shell type heat exchanger of claim 18, wherein said metallic material braze foil is comprised of an aluminum braze alloy.

23. The tube and shell type heat exchanger of claim 18, wherein the fillet is formed by heating said core tube and said accommodating header plate in a vacuum brazing furnace.

24. The tube and shell type heat exchanger of claim 18, wherein the fillet is formed by heating said core tube and said accommodating header plate in an inert atmosphere furnace.

25. The tube and shell type heat exchanger of claim 18, wherein the axial extent of said intimate contact area substantially corresponds to the length of said ferrule first cylindrical portion.

26. The tube and shell type heat exchanger of claim 18, wherein the axial extent of said seal substantially corresponds to the length of said ferrule first cylindrical portion.

27. The tube and shell type heat exchanger of claim 18, wherein the surface extent of the braze foil substantially corresponds to the bottom surface area of said ferrule second annular portion.

28. The tube and shell type heat exchanger of claim 18, wherein said deformed ferrule second annular portion directs said melted braze foil into said intimate contact area.

29. A method of providing a leak tight connection between a core tube and an accommodating header plate in a tube and shell type heat exchanger, including:
 a. providing a header plate with a core tube accommodating through bore therein;
 b. providing a braze foil with a core tube accommodating through bore therein;
 c. providing a core tube with an end having an outside diameter approximately the same as said header plate bore diameter;
 d. positioning said braze foil on top of said header plate so that said accommodating through bore in said braze foil is aligned with said accommodating through bore in said header plate;

e. inserting said core tube end into the through bore in said header plate so that it is received therein and said tube end is substantially coplanar with said braze foil;

f. installing a ferrule into said inserted core tube end, said ferrule having a cylindrical shank portion of a predetermined length having an outside diameter approximately the same as an inside diameter of said core tube and a head portion radially extending from one end of said cylindrical shank portion a distance greater than the wall thickness of said core tube;

g. expanding said ferrule radially so that said cylindrical shank portion is pressed against said core tube, thus in turn deforming said core tube into an area of intimate contact with said accommodating through bore of the header plate;

h. then deforming said ferrule head portion into an area of deformation contact with an adjacent portion of said braze foil at said intimate contact area of said header plate and core tube; and i. brazing said core tube and header plate in a brazing furnace at a temperature and for a time sufficient for said braze foil to melt and flow from said deformation contact area towards and into said intimate contact area of said header plate and core tube, via capillary action, thus forming a leak tight seal in said intimate contact area.

30. The method of claim 29, wherein in the deforming step, said ferrule head portion has a radial extent greater than said wall thickness of said core tube.

31. The method of claim 29, further including:

a. effecting the expansion of said ferrule by movement of a mandrel with an expander portion longitudinally through said ferrule from said cylindrical shank portion to and through said head portion, said expander portion having an outside diameter greater than an inside diameter of said ferrule; and b. simultaneously applying an opposing force to said ferrule in a direction opposite to said movement.

32. The method of claim 29, wherein said brazing step takes place in a vacuum furnace.

33. The method of claim 31, wherein said expander portion is a tear-drop shaped portion, flexibly affixed to said mandrel.

34. The method of claim 29, wherein the axial extent of said intimate contact area substantially corresponds to the length of said ferrule shank.

35. The method of claim 29, wherein the axial extent of said seal substantially corresponds to the length of said ferrule shank.

36. The method of claim 29, wherein the surface extent of the braze foil substantially corresponds to the bottom surface area of said ferrule head portion.

37. The method of claim 29, wherein said deformed ferrule head portion directs said melted braze foil into said intimate contact area.

38. A leak tight connection between a core tube and an accommodating header plate in a tube and shell type heat exchanger, which comprises in combination:

a. a header plate of a deformable metallic material with a core tube-accommodating through bore therein;

b. a metallic material braze foil with a core tube accommodating through bore therein positioned on top of said header plate so that said accommodating bore in said braze foil is aligned with said accommodating bore in said header plate;

c. a core tube of a deformable metallic material with an end having an outside diameter approximately the same as said header plate bore diameter received within said accommodating through bores of said header plate and said braze foil;

d. a ferrule installed inside said core tube end having a cylindrical shank portion with an outside diameter approximately the same as an inside diameter of said core tube and a head portion radially expanding from one end of said cylindrical shank portion a distance greater than the wall thickness of said core tube;

e. means for deforming said ferrule such that deformation of said shank presses said core tube into intimate contact with said header plate and deformation of said head portion directs said braze foil into said intimate contact area;

f. a fillet formed by heating said core tube and shell heat exchanger in a brazing furnace at a temperature and for a time sufficient for said braze foil to melt and flow from said deformation contact area towards and into said intimate contact area of said header plate and tube thus forming a seal, via capillary action, in said intimate contact area.

* * * * *